D. GUPTAIL.

Soldering-Machines.

No. 156,343. Patented Oct. 27, 1874.

WITNESSES:
Phillip W. Hale
N. H. Sherburne

INVENTOR
Dan Guptail
By Sherburne & Co
his Attorneys ns.
UNITED STATES PATENT OFFICE.

DAN GUPTAIL, OF ELGIN, ILLINOIS, ASSIGNOR OF ONE-HALF HIS RIGHT TO F. L. McCLURE, OF SAME PLACE.

IMPROVEMENT IN SOLDERING-MACHINES.

Specification forming part of Letters Patent No. 156,343, dated October 27, 1874; application filed April 9, 1874.

*To all whom it may concern:*

Be it known that I, DAN GUPTAIL, of Elgin, in the county of Kane and State of Illinois, have invented certain new and useful Improvements in Soldering-Machines; and I do hereby declare the following to be a clear, full, and exact description thereof, which will enable others skilled in the art to which my invention appertains to make and use the same, reference being had to the accompanying drawings, forming part of this specification, in which—

Figure 1:
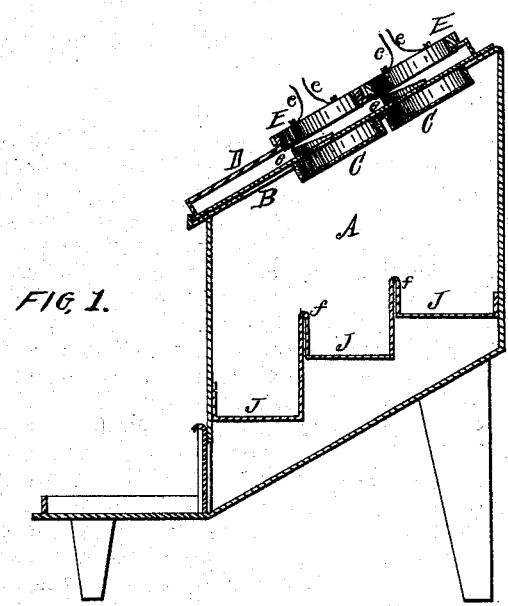
Figure 2:
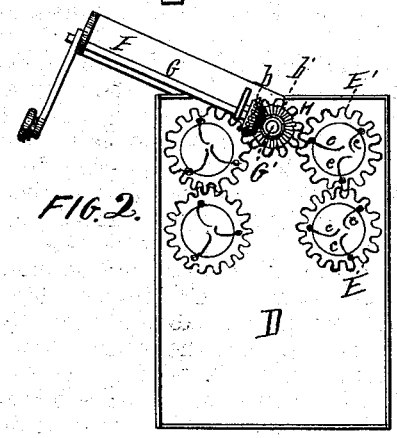
Figure 3:
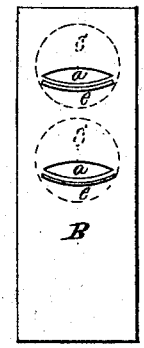

Figure 1 is a vertical longitudinal section of a soldering-machine embodying my said invention. Fig. 2 is a top view of the same, and Fig. 3 is a top view of the soldering-plate detached.

Similar letters of reference indicate like parts in the several figures of the drawing.

My invention relates to that class of soldering-machines used in soldering the ends of tin cans; and the improvement consists in providing a soldering-plate, having a series of receptacles within which the solder is placed, and which are so arranged as to come in contact with the products of combustion, whereby the solder is fused, in combination with a series of geared disks adapted to receive, hold, and revolve the can in such a manner as to cause the corners of the latter to pass through the fused solder, all of which will be more fully understood by the description and claims.

In the accompanying drawings, A represents the heating-case, which is usually made of cast-iron; but it may be made of sheet-iron, if desired. The upper and lower surfaces of this case are arranged at an obtuse angle to the vertical plane of the front of the case, as shown in Fig. 1. B is the soldering-plate, which is loosely attached to the upper surface of the case. This plate is provided on its lower surface with a series of receptacles, C C, and it is also provided with elongated apertures $a$, which pass through the plate at a point near the periphery of the receptacles at their lower edge, as shown in Figs. 1 and 2. D is the cover of the case, which is loosely attached to the upper surface of plate B. This cover is provided with a series of openings, within which are fitted gear-disks E E', which are so arranged as to engage one with the other, and to freely revolve. These disks are provided at their center with an opening adapted to receive the can, and are so arranged as to bring the periphery of the end of the can immediately over the aperture in the plate. Attached to the upper surface of each disk are springs $c\ c\ c$, which are so adjusted as to hold the can at the center of the opening in the disk, regardless of the diameter of the can. F is a metal frame, one end of which is permanently attached to cover D. Within this frame is secured a crank-shaft, G, which is so arranged as to revolve freely on its bearings. Mounted on the end of this shaft is a gear-pinion, $b$, which engages a corresponding gear-pinion, $b'$, mounted on a vertical shaft, G', secured within boxes attached to cover D. Attached to this shaft G' is a gear-wheel, H, which engages with disk E', by which means a rotary movement is imparted to the disk by the rotation of shaft G. Attached to the upper surface of plate B, slightly below the lower edge of each aperture, is a curve lip, $e$, which extends upward slightly above the plate. These lips prevent the solder from passing down upon the upper surface of the plate as the same flows through the aperture. The plate is so attached to the upper portion of the case as to admit of being moved upward and secured at any adjusted point. The object of this is to bring the aperture immediately under the periphery of the end, and the inner surface of the lip against the side of the can when those of smaller diameters are to be soldered. J is a series of grates, which are so arranged within the case as to bring one set above the other, the object of which is to bring the fire at a uniform distance from the plate. These grates are bent upward, as shown at $f$, Fig. 1, by which means the fuel used in heating the plates is prevented from passing from one set of grates to the other.

My invention is used as follows: The solder is placed in the receptacle, and the cans to be soldered are placed within the disks, and by the action of the heat against the lower surface of the receptacle the solder is properly fused, which flows through the aperture and against the end of the can. Motion is then imparted to the disks by the rotation of the crank, which causes the can to rotate, bringing the corner of the same through the fused solder.

It will be seen that the soldering-plate and the plan of the disks are arranged on an incline, the object of which is to bring only a portion of the corner of the can into the solder at one and the same time.

In describing my invention I have mentioned only one soldering-plate and its corresponding disks; but I design using two plates and two sets of disks, the latter being arranged to engage the opposite side wheel H, as shown in Fig. 2, which enables the machine to work with great rapidity, as several cans may be in process of being soldered at one and the same time.

Having thus described my invention, I claim—

1. The inclined plate B, having the apertures $a$ $a$, and provided with receptacles C C, as specified.

2. In combination with the inclined plate B, as described, the open geared disks E E', for holding and rotating the cans, as specified.

3. In combination with the open disks E E', the adjusting-springs $c$ $c$ $c$, as specified.

4. The inclined plate B, provided with the lips $e$ $e$, as and for the purpose specified.

The above specification of my invention signed by me this 27th day of October, A. D. 1873.

DAN GUPTAIL.

Witnesses:
N. H. SHERBURNE,
THOMAS J. BURKE.